May 19, 1953

K. RAMSEY 2,638,671

APPARATUS FOR TRANSLATING AND PLOTTING LOG
CHARTS FROM DRILLING TIME CHARTS

Filed June 14, 1951

INVENTOR.
King Ramsey
BY
Fishburn & Mullendore
ATTORNEYS.

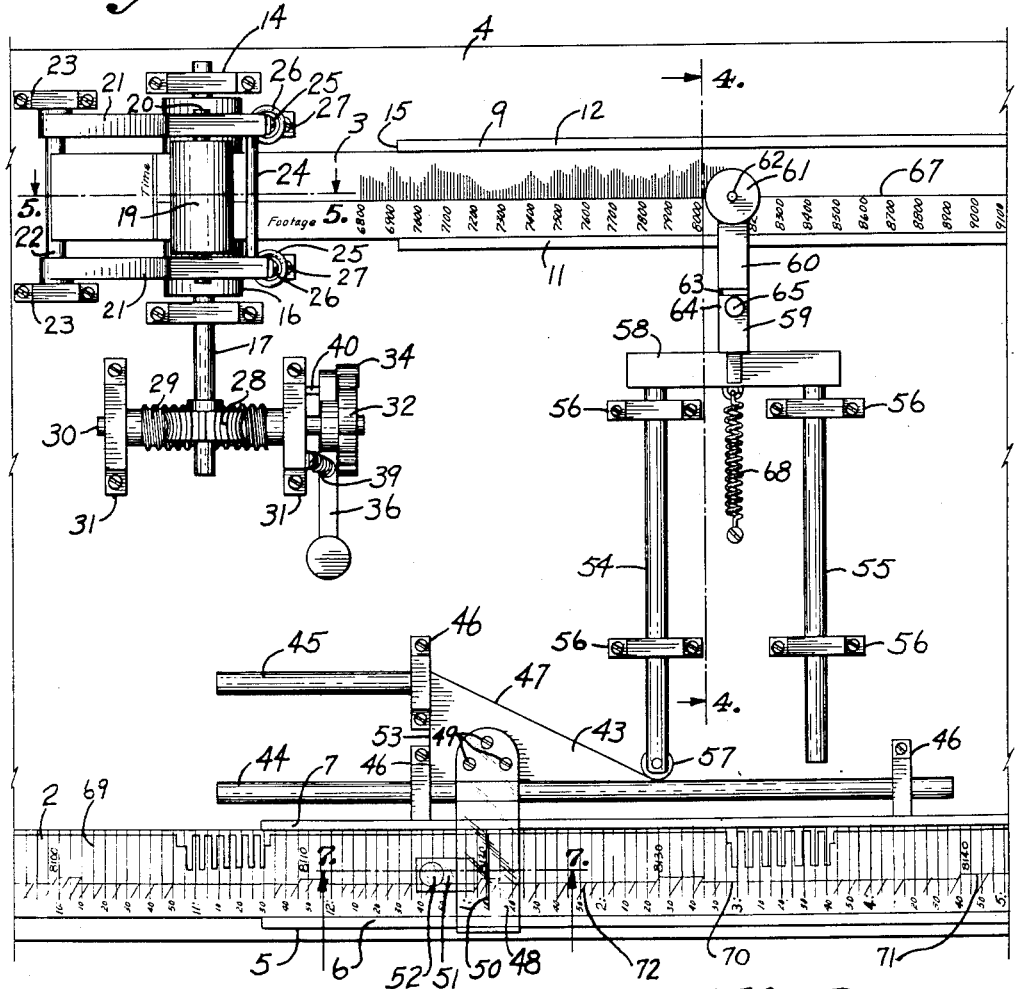
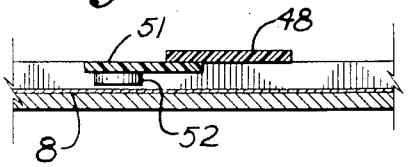
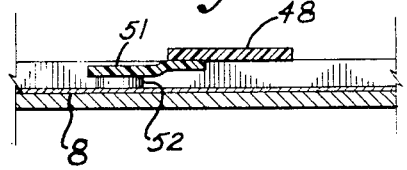
INVENTOR.
King Ramsey

May 19, 1953  K. RAMSEY  2,638,671
APPARATUS FOR TRANSLATING AND PLOTTING LOG
CHARTS FROM DRILLING TIME CHARTS
Filed June 14, 1951  3 Sheets-Sheet 3
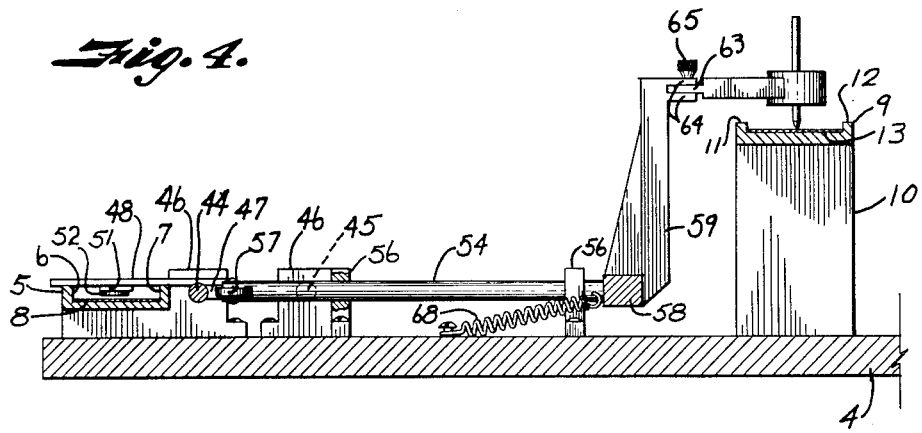
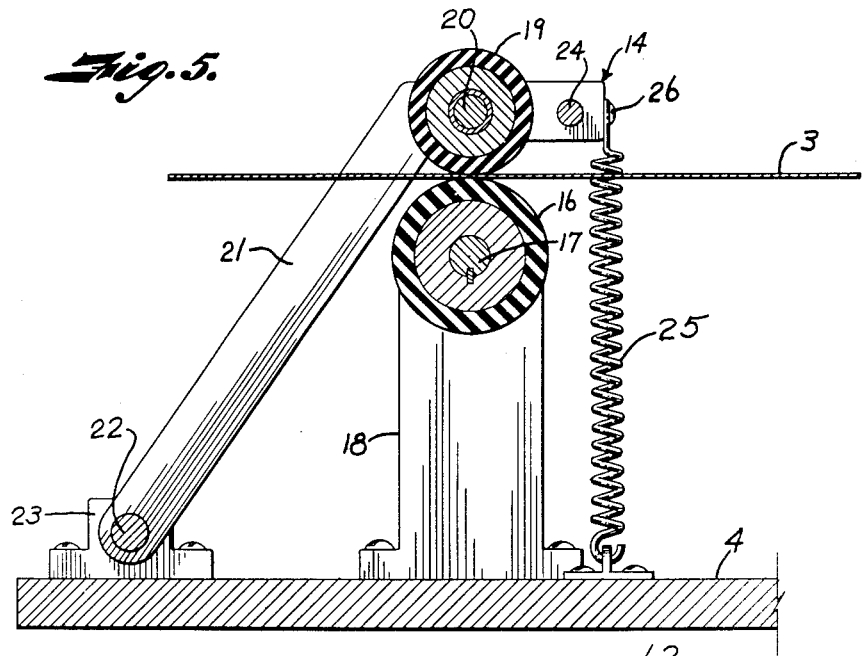
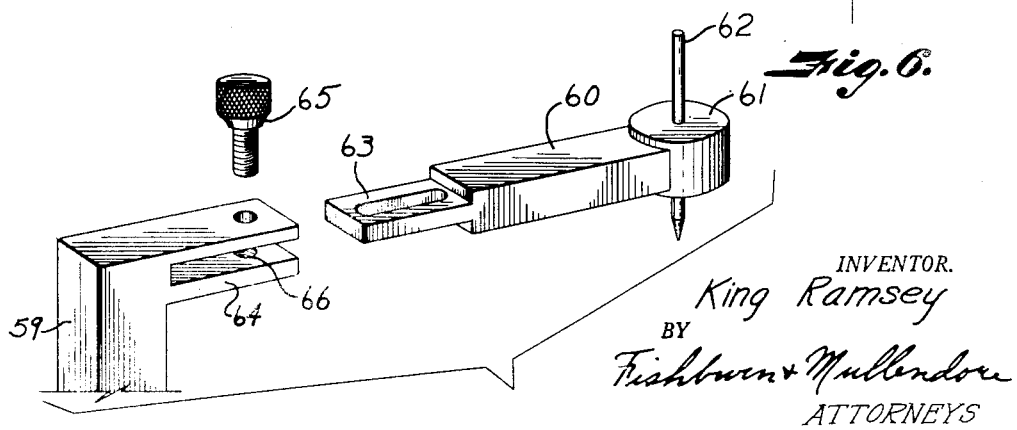
INVENTOR.
*King Ramsey*
BY
*Fishburn & Mullendore*
ATTORNEYS Patented May 19, 1953

2,638,671

UNITED STATES PATENT OFFICE 2,638,671

APPARATUS FOR TRANSLATING AND PLOTTING LOG CHARTS FROM DRILLING TIME CHARTS

King Ramsey, Odessa, Tex., assignor to The Geolograph Company, Inc., Oklahoma City, Okla., a corporation of Oklahoma Application June 14, 1951, Serial No. 231,484

6 Claims. (Cl. 33—1)

This invention relates to the method and apparatus for translating and plotting log charts from drilling time charts of wells and more particularly to an arrangement of charts and movement thereof in plotting the information thereon.

In the drilling of wells such as oil and gas wells, it is customary to prepare a chart to show the progress of the work. Some such charts are prepared on apparatus manufactured under the Nichols Patent No. 2,287,819 wherein the chart is in the form of a long strip having indicia and lines to show elapsed time and plotted thereon are marks showing units of depth drilled. Such a chart may be said to show the drilling time by plotting variable or irregular footage or depth against constant time. It is desirable to show the information on a chart having a constant footage scale with the drilling time for said footage plotted as a variable thereon.

The objects of the present invention are to provide apparatus for utilizing conventional drilling time charts and from them plot the information on other charts having a different constant scale; to provide a method of and apparatus for translating from a drilling time chart using constant time plotted against variable footage to a chart or the like having constant footage plotted against variable time; to provide apparatus for advancing a chart of a well in uniform, predetermined stages representing unit depths and after each movement plot thereon the time for drilling said unit depth of the well; to provide mechanism for translating from a drilling time chart which has constant time plotted against irregular depth to a chart having constant depth plotted against irregular time; and to provide a method and apparatus for accurately and efficiently plotting and/or correlating drilling time of a well on charts having desired constants.

In accomplishing these and other objects of the present invention, I have provided improved details of structure, the preferred forms of which are illustrated in the accompanying drawings, wherein:

Fig. 2 is a plan view of the information translating apparatus.

Fig. 4 is a transverse sectional view through the apparatus on the line 4—4, Fig. 2.

Fig. 5 is a longitudinal sectional view through the chart advancing rolls on the line 5—5, Fig. 2.

Fig. 6 is a disassembled perspective view of the marking stylus supporting arm.

Fig. 7 is a longitudinal sectional view of the drilling time chart advancing member on the line 7—7, Fig. 2.

Fig. 8 is a sectional view similar to Fig. 7, with the chart advancing arm in engagement with the chart.

Figure 1:
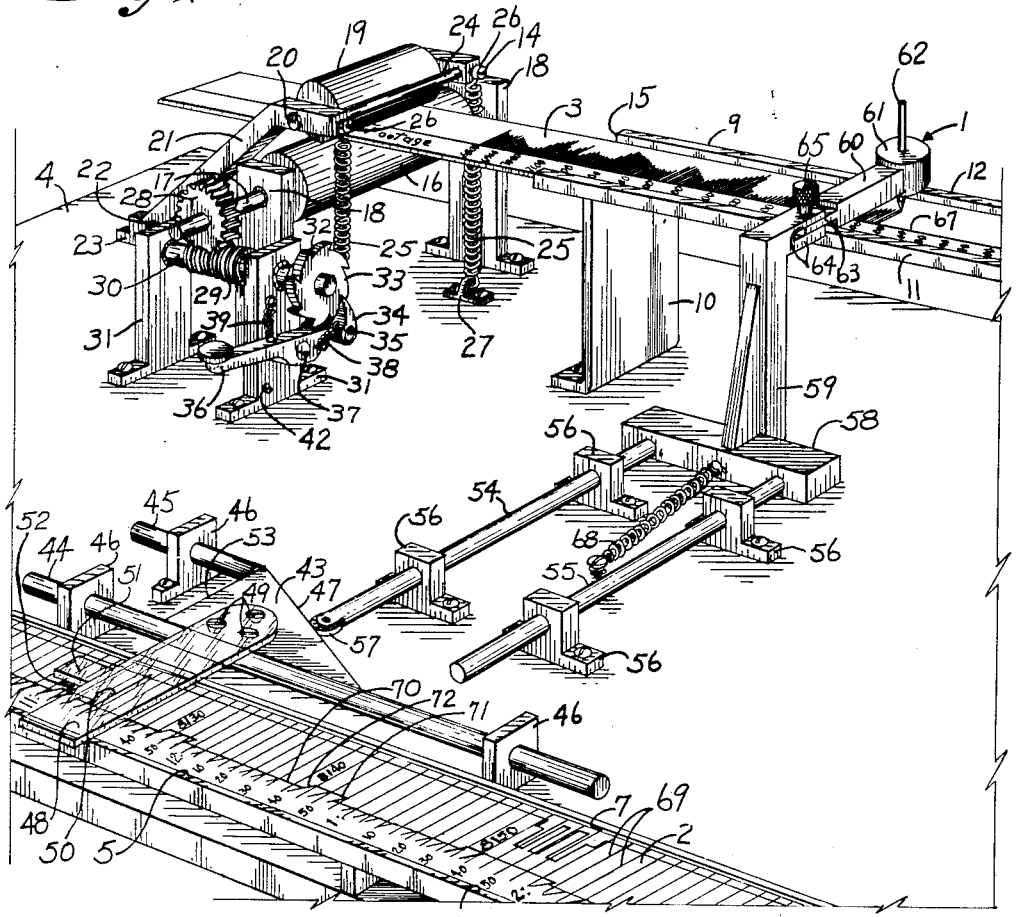
Fig. 1 is a perspective view of apparatus for translating information from a drilling time chart to a log chart having constant footage thereon.

Referring more in detail to the drawings:

1 designates apparatus for translating information from a drilling time chart 2 and plotting same on a sample log chart 3. The apparatus consists of a support or table 4, on which is located a track 5 arranged longitudinally of the table adjacent one side thereof. The track 5 includes guide strips 6 and 7 having their inner faces spaced substantially the same as the width of the chart 2 and adapted to substantially engage the side edges of same whereby the chart 2 lays flat on the upper face 8 of the track between the guide strips and is movable longitudinally thereof.

A sample log chart track 9 is supported in elevated condition relative to the table and adjacent the side opposite the track 5 by means of brackets 10, the track 9 being parallel with the track 5. The track 9 includes guide strips 11 and 12 suitably spaced to substantially engage the side edges of the chart 3 whereby the chart lays flat on the upper face 13 of the track 9 and is movable longitudinally thereof between the guides.

The chart 3 is advanced or moved longitudinally in uniform, predetermined stages by chart advancing mechanism 14 adjacent the end 15 of the track 9. The chart advancing mechanism preferably consists of a drive roller 16 fixed on a shaft 17 and rotatably mounted in spaced bearings 18 fixed to the table 4. The drive roller is arranged with its axis transversely of the line of movement of the chart 3 with the upper portion of the periphery of the roller substantially in the same plane as the upper face 13 of the track 9. Driving contact between the drive roller 16 and the chart 3 is maintained by means of a pressure roller 19 rotatably mounted on a shaft 20 having its ends fixed in spaced arms 21 which extend downwardly and forwardly and have their lower ends pivotally mounted on a shaft 22 carried in brackets 23 on the table 4. The ends of the arms adjacent the roller 19 are rigidly connected by a bar 24 whereby the arms move in unison.

Springs 25 have their upper ends connected as at 26 with the upper ends of the arms 21, the lower ends of said springs being connected to eyes 27 carried on the table 4 whereby said springs 25 exert downward pressure on the upper ends of the arms 21 which pressure is transmitted through the shaft 20 to the pressure roller 19, assuring driving contact between the drive roller 16 and the chart 3.

Figure 3:
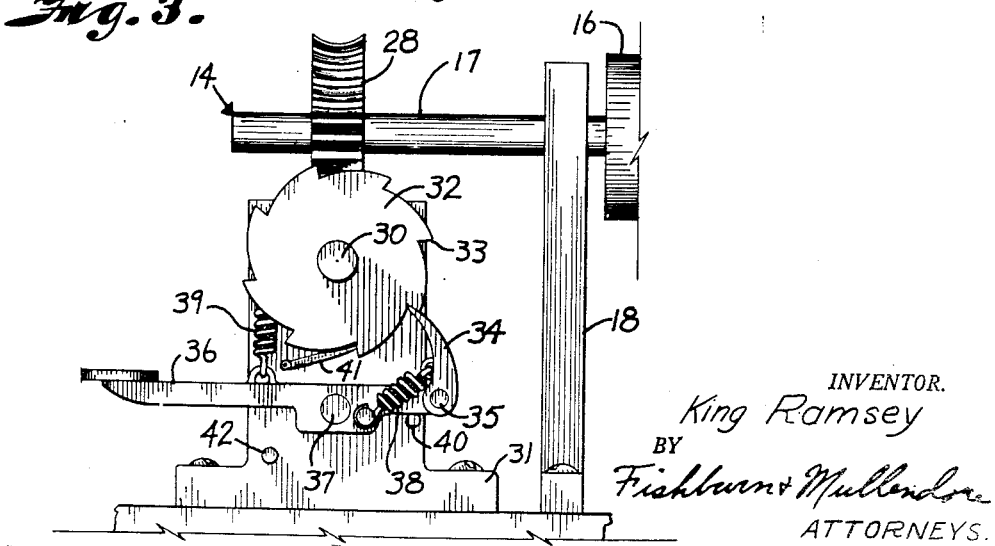
Fig. 3 is an elevational view of a ratchet mechanism for advancing a log chart in predetermined, uniform stages.

A worm gear 28 is fixed on the shaft 17 and has meshing engagement with the worm 29 fixed on a shaft 30 rotatably mounted in spaced bearing members 31. A ratchet wheel 32 is fixed to the shaft 30 and has a plurality of peripheral teeth 33 adapted to be engaged by a pawl 34 pivotally mounted for limited rocking movement on a pin 35 carried on one end of a lever 36 rotatably mounted on a pin 37 carried by one of the bearing members 31. A spring 38 has one end connected to the lever 36 and the other end to the pawl 34 to urge the pawl into engagement with the stop on the lever 36 to limit movement of the pawl toward the lever. A spring 39 has its ends connected with the lever 36 and bearing member 31 to resiliently urge the pawl end of the lever 36 downwardly, a stop 40 being arranged for engagement with the lever 36 to limit said downward movement. The other end of the lever 36 is provided with a knob whereby downward pressure on the knob swings the pawl end of the lever upwardly to rotate the ratchet 32. The stop 42 is provided on the bearing member 31 to limit the advancing movement of the lever 36. A flat spring 41 has one end fixed to the bearing member 31 and the other end resiliently engages the ratchet teeth to prevent backing movement of the ratchet whereby said ratchet rotates only in one direction. When pressure is removed from the knob, the spring 39 returns the lever 36 to the position shown in Fig. 3. During this return movement the pawl 34 rides over the teeth of the ratchet into engagement with the next tooth in position for the next advancing movement. The increment of movement of the ratchet 32 rotates the shaft 30 and worm 29 thereon to drive the worm gear 28, rotating the shaft 17 and drive roller 16, each operation of the lever rotating the drive roller 16 to advance the chart 3 the desired distance of the uniform, predetermined stage of advancement, which represents a unit of drilling depth, for example, of ten feet.

A wedge plate 43 is fixed to a carriage consisting of spaced rods 44 and 45 slidably mounted in bearing members 46 carried by the table 4, the rods 44 and 45 being parallel to the track 5 and arranged to support the wedge plate 43 for movement in a horizontal plane longitudinally of the track 5. The rod 44 is preferably adjacent the track 5, as illustrated in Fig. 1, whereby the sloping or cam surface 47 of the wedge plate slopes away from the rod 44 toward the opposite side of the table. A reference stylus 48, preferably of transparent material, is secured by suitable fastening devices 49 to the wedge plate and extends therefrom over the track 5, said stylus having a reference line 50 extending transversely of the track 5 whereby said line may be easily registered with indicia and lines on the chart 2 carried in the track 5.

A resilient arm 51 is fixed on the reference stylus 48 and extends therefrom above the track 5, a friction member 52 being secured to the lower face of the arm 51 whereby downward pressure on the arm 51 will move the friction member into engagement with the chart 2 carried in the track 5 whereby when the wedge member 43 is moved longitudinally of the track 5 with the friction member 52 in engagement with the chart 2, the chart will be moved simultaneously with the wedge member for a corresponding distance. It is preferable that the bearing members 46 adjacent the large end 53 of the wedge plate 43 serve as stops whereby when the wedge plate is engaged with the bearing members the reference line 50 will be positioned above the drilling time chart 2 having indicia thereon indicating the start of a unit of drilling depth.

A second carriage consisting of parallel rods 54 and 55 is arranged perpendicular to the rods 44 and 45 and are slidably mounted in bearing members 56 for endwise movement in a horizontal plane corresponding to the plane of the wedge plate 43. A roller 57 is rotatably mounted on the end of the rod 54 in position to engage the cam surface 47 of the wedge plate 43. The ends of the rods 54 and 55, remote from the track 5, are secured to a cross member 58, having an upwardly extending post 59 having an arm 60 at its upper end extending over the track 9 and having a terminal end 61 supporting a marking stylus 62. The arm 60 is preferably formed of two pieces, one of which has a slotted ear 63 extending between spaced members 64 on the other piece which carries a screw 65 threadedly mounted in an aperture 66 and adapted to extend through the slot in the ear 63, whereby the length of the arm 60 is adjustable to position the point of the marking stylus 62 on a base line 67 when the roller 57 is engaged with the cam surface 47 of the wedge plate and the large end of the wedge plate is in engagement with the bearing members 56 forming the stop therefor.

A spring 68 has one end fixed to the cross member 58 and the other end to the table whereby the tension of the spring draws the cross member toward the track 5 and urges the roller 57 into engagement with the cam surface of the wedge plate 43. With this arrangement, when the wedge plate 43 and reference stylus 48 thereon are moved to the right, as shown in Figs. 1 and 2, the cam surface 47 of the wedge plate through its engagement with the roller 57 moves the rod 54 and slide 58 toward the track 9 whereby the marking stylus 62 makes a transverse mark on the chart 3. When the wedge plate 43 is then returned to the limit of its movement to the left, Figs. 1 and 2, the spring 68 will cause the roller 57 to follow the cam surface 47 and return the marking stylus 62 to the base line 67.

The angle of the cam surface 47 on the wedge plate 43 determines the relative ratio between the scale on the drilling time chart and the scale on the sample log or drilling time chart 3.

In using an apparatus constructed as described, the drilling time chart 2 is arranged in the track 5 between the guide strips 6 and 7. The drilling time chart illustrated has a plurality of spaced transverse lines 69, the spacing between said lines indicating an interval of five minutes. Extending longitudinally of the chart is a line 70, having offset portions 71. Each offset indicates the completion of ten feet of drilling, the vertical line being offset for two feet and then retracted to its normal position for the next eight feet. This arrangement gives a two foot datum every ten feet of drilling for convenience in counting the footage. Arranged along the line 70 is a plurality of diagonal lines 72, the spacing between the diagonal lines indicating a drilling depth of one foot. A chart 3 is arranged in the track 9 and the end inserted between the driving roller 16 and pressure roller 19. The chart 3 has a base line 67 and on one side of said base line is indicia indicating the total drilling depth in feet. The chart 3 is arranged whereby a footage indicia adjacent the marking stylus 62 is correlated with the depth of the well under the reference line 50 when the large end 53 of the wedge plate 43 is engaged with the adjacent bearing members 46. Then with the friction member 52 spaced from the chart 2, the reference stylus and wedge plate are moved to the right a distance corresponding to ten spaces defined by the diagonal lines. During this movement, the cam surface 47 engages the roller 57 forcing the rods 54 and 55, cross member 58, laterally of the table to move the marking stylus transversely of the chart 3, drawing a line having a length relative to the elapsed time for the drilling of the ten feet in depth of the well. Then the arm 51 is pressed downwardly to engage the friction member 52 with the chart 2 and while so engaged the reference stylus and wedge plate are moved to the left, Figs. 1 and 2, until the wedge plate engages the bearing members 46. The engagement of the friction member 52 with the chart 2 effects simultaneous corresponding movement of the chart 2. The knob of the lever 36 is then pressed downwardly to operate the lever 36 to move the ratchet wheel 32, operating the worm 29 and the form gear 28 to drive the roller 16 to advance the chart 3 a predetermined distance, which on the chart is equivalent to ten feet in depth. The reference stylus and wedge plate are then again moved to the right, Figs. 1 and 2, a distance corresponding to ten spaces defined by the diagonal lines which indicate ten feet in depth, the apparatus again marking a transverse line on the chart 3 to indicate the relative time required for the drilling of said ten feet in depth.

Continued operation of the apparatus in this manner will form indicia on the chart 3, as illustrated in Fig. 2, wherein the spacing for the footage is constant and the drilling time is variable.

What I claim and desire to secure by Letters Patent is:

1. An apparatus for translating information from a well drilling time chart having constant time plotted against irregular depth to a log chart having constant depth plotted against irregular time comprising, a support, a track on the support for movably receiving a well drilling time chart, a second track spaced from and parallel to the first named track for movably receiving a log chart, a marking stylus, means movably mounted on the support for supporting the marking stylus for movement transversely of the log chart, resilient means urging the marking stylus support toward initial position thereof, means engaging the log chart for advancing same in increments of length corresponding to indicia of a unit of well depth, manually actuated means for operating the log chart advancing means, a reference stylus movable longitudinally of the well drilling time chart, cooperating means on the reference stylus and marking stylus support for proportionately moving the marking stylus support transversely of the log chart while the reference stylus is moved longitudinally of the well drilling time chart a distance corresponding to the elapsed time for drilling a unit depth, and means on the reference stylus and frictionally engageable with the well drilling time chart for moving same during return movement of the reference stylus thereof to initial position.

2. An apparatus for translating information from a well drilling time chart having constant time plotted against irregular depth to a log chart having constant depth plotted against irregular time comprising, a support, a track on the support for movably receiving a well drilling time chart, a second track spaced from and parallel to the first named track for movably receiving a log chart, a marking stylus, means movably mounted on the support for supporting the marking stylus for movement transversely of the log chart, resilient means urging the marking stylus support toward initial position thereof, means engaging the log chart for advancing same in increments of length corresponding to indicia of a unit of well depth, means having an inclined cam surface movable longitudinally of the well drilling time chart, said inclined cam surface engaging the marking stylus support for moving same transversely of the log chart in proportion to the longitudinal movement of inclined cam surface means, a reference stylus fixed to the means having the inclined surface and extending over the well drilling time chart for determining the length of longitudinal movement of the inclined cam surface corresponding to the elapsed time for drilling a unit depth, and means on the reference stylus and engageable with the well drilling time chart for moving same during return movement of the reference stylus to initial position.

3. An apparatus for translating information from a well drilling time chart having constant time plotted against irregular depth to a log chart having constant depth plotted against irregular time comprising, a support, a track on the support for movably receiving a well drilling time chart, a second track spaced from and parallel to the first named track for movably receiving a log chart, a marking stylus, means movably mounted on the support for supporting the marking stylus for movement transversely of the log chart, resilient means urging the marking stylus support toward initial position thereof, means engaging the log chart for advancing same in increments of length corresponding to indicia of a unit of well depth, manually actuated means for operating the log chart advancing means, a wedge plate movable longitudinally of the well drilling time chart, said wedge plate having an inclined cam surface engaging the marking stylus support for moving same transversely of the log chart in proportion to the longitudinal movement of the wedge plate, a reference stylus fixed to the wedge plate and extending over the well drilling time chart for determining the length of longitudinal movement of the wedge plate corresponding to the elapsed time for drilling a unit depth, and friction means on the reference stylus and engageable with the well drilling time chart for moving same during return movement of the reference stylus to initial position.

4. An apparatus for translating information from a well drilling time chart having constant time plotted against irregular depth to a log chart having constant depth plotted against irregular time comprising, a support, an elongated track on the support and adjacent one edge thereof for movably receiving a well drilling time chart, a second track on the support, said second track being spaced from and parallel to the first named track for movably receiving a log chart, a marking stylus, a carriage slidably supported on the support between the tracks for movement relatively transversely thereof, means adjustably mounting the marking stylus on the carriage, manually operated means for advancing a log chart in increments of length corresponding to indicia of a unit of well depth, a second carriage slidably mounted on the support adjacent the first named track and movable longitudinally thereon, means on the second named carriage engaging the first named carriage to move same transversely of the tracks in response to longitudinal movement of the second named carriage, a reference stylus fixed on the second named carriage and extending over the well drilling time chart for gauging longitudinal movement of the second carriage according to indicia on the well drilling time chart whereby movement of the reference stylus relative to the well drilling time chart to indicate a unit of drilling depth moves the second carriage and proportionately moves the first carriage to move the marking stylus transversely of the log chart, and means on the second carriage engageable with the well drilling time chart for moving same with the reference stylus during return movement thereof to initial position.

5. An apparatus for translating information from a well drilling time chart having constant time plotted against irregular depth to a log chart having constant depth plotted against irregular time comprising, a support having a substantially horizontal upper face, an elongated track on the upper face of the support and adjacent one edge thereof for movably receiving a well drilling time chart, a second track on the support and adjacent the opposite side thereof from the first named track, said second track being spaced from and parallel to the first named track for movably receiving a log chart, each of said tracks having recessed longitudinal grooves substantially the same width as the charts received therein whereby the charts are movable only longitudinally of the tracks, a marking stylus, a carriage slidably supported on the support between the tracks for movement relatively transversely thereof, means adjustably mounting the marking stylus on the carriage, manually operated means for advancing a log chart in increments of length corresponding to indicia of a unit of well depth, a second carriage slidably mounted on the support adjacent the first named track and movable longitudinally thereof, means on the second named carriage engaging the first named carriage to move same transversely of the tracks in response to longitudinal movement of the second named carriage, a reference stylus fixed on the second named carriage and extending over the well drilling time chart for gauging longitudinal movement of the second carriage according to indicia on the well drilling time chart whereby movement of the reference stylus relative to the well drilling time chart to indicate a unit of drilling depth moves the second carriage and proportionately moves the first carriage to move the marking stylus transversely of the log chart, and means on the reference stylus frictionally engageable with the well drilling time chart for moving same with the reference stylus during return movement thereof to initial position.

6. An apparatus for translating information from a well drilling time chart having constant time plotted against irregular depth to a log chart having constant depth plotted against irregular time comprising, a support having a substantially horizontal upper face, an elongated track on the upper face of the support and adjacent one edge thereof for movably receiving a well drilling time chart, a second track on the support and adjacent the opposite side thereof from the first named track, said second track being spaced from and parallel to the first named track for movably receiving a log chart, each of said tracks having recessed longitudinal grooves substantially the same width as the charts received therein whereby the charts are movable only longitudinally of the tracks, a marking stylus, a carriage slidably supported on the support between the tracks for movement relatively transversely thereof, means adjustably mounting the marking stylus on the carriage, a resilient member having engagement with the carriage to urge same toward the first named track, rolls rotatably mounted adjacent the end of the second named track and drivingly engaging the log chart, manually operated ratchet means having driving connection with the driving rolls for intermittently operating same to advance a log chart in increments of length corresponding to indicia of a unit of well depth, a second carriage slidably mounted on the support adjacent the first named track and movable longitudinally thereof, means on the second named carriage having an inclined cam surface engaging the first named carriage to move same transversely of the tracks in response to longitudinal movement of the second named carriage, a reference stylus fixed on the second named carriage and extending over the well drilling time chart for gauging longitudinal movement of the second carriage according to indicia on the well drilling time chart whereby movement of the reference stylus relative to the well drilling time chart to indicate a unit of drilling depth moves the second carriage and proportionately moves the first carriage to move the marking stylus transversely of the log chart, and means on the reference stylus frictionally engageable with the well drilling time chart for moving same with the reference stylus during return movement thereof to initial position.

KING RAMSEY.

References Cited in the file of this patent

UNITED STATES PATENTS

| Number | Name | Date |
|---|---|---|
| 2,258,859 | Mitelman | Oct. 14, 1941 |
| 2,348,411 | Petty | May 9, 1944 |
| 2,442,098 | Shewell et al. | May 25, 1948 |
| 2,463,534 | Hawkins | Mar. 8, 1949 |

FOREIGN PATENTS

| Number | Country | Date |
|---|---|---|
| 727,371 | Germany | Nov. 4, 1942 |